Patented Jan. 17, 1939

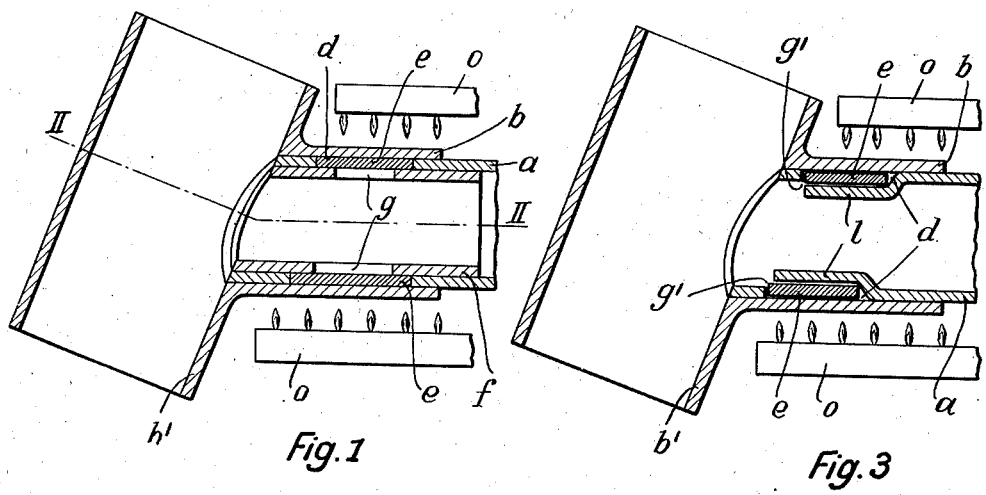
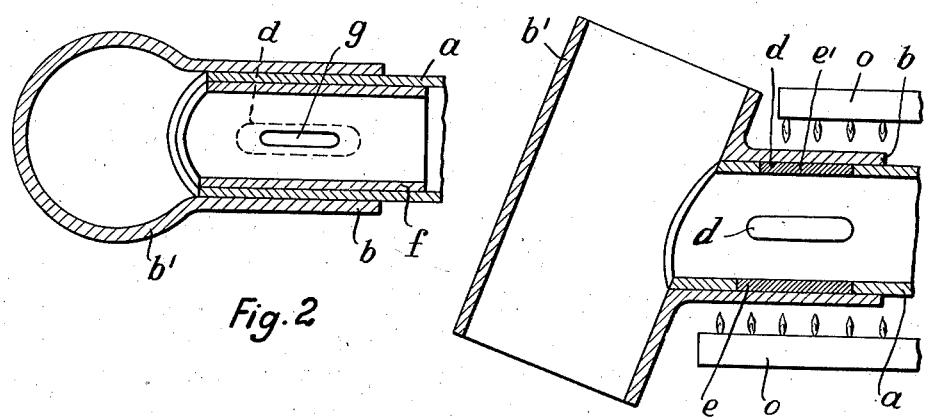
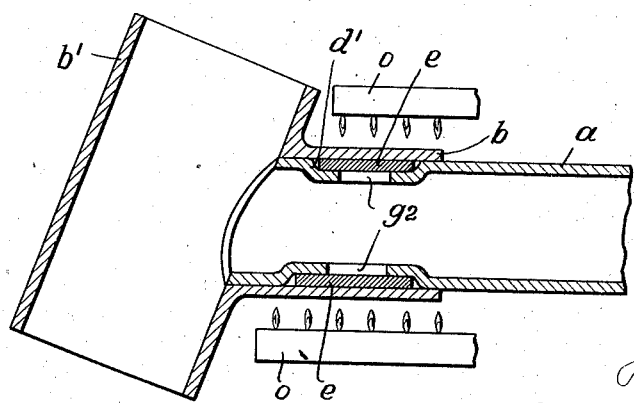

2,144,332

UNITED STATES PATENT OFFICE 2,144,332

METHOD OF SOLDERING HOLLOW BODIES

Amandus Glaser, Berlin, Germany

Application January 30, 1936, Serial No. 61,556
In Germany February 4, 1935

4 Claims. (Cl. 113—112)

My invention relates to improvements in the method of soldering hollow bodies, and more particularly in the method of soldering telescoping tubular members. My method is particularly suitable for joining the tubular frame members of bicycles and motor vehicles. The object of the improvement is to provide a soldered joint which requires a minimum of solder, which does not need finishing work after soldering, and which is strong. With this object in view my invention consists in forming the members at the parts to be joined with small pockets or cut-out portions adapted to receive and hold in position measured amounts of soldering material, and heating the joint to soldering temperature, the said pockets or cut-out portions being open at some part for permitting the escape of gaseous matter from the joint and preventing the same from passing between the surfaces to be soldered.

For the purpose of explaining the invention several examples embodying the same have been shown in the accompanying drawing in which the same letters of reference have been used in all the views to indicate corresponding parts. In said drawing Fig. 1 is a sectional elevation showing the joint of the upper tubular frame member with the sleeve of the steering rod of a bicycle, Fig. 2 is a sectional plan view taken on the line 2—2 of Fig. 1, and Figs. 3 to 5 are sectional elevations similar to the one shown in Fig. 1 and showing modifications.

In the example shown in Figs. 1 and 2, the joint to be soldered consists of the upper tubular member $a$ of a bicycle frame and the usual T-shaped member $b$, $b'$ connecting the same to the sleeve of the steering rod, the member $a$ being telescopingly placed within the portion $b$ of the member $b$, $b'$. Before thus assembling the parts the wall of one of the members to be joined and preferably the inner member $a$ is formed all around with a suitable number of longitudinal cut-out portions or slits $d$, and the said slits are filled out with solder $e$, such as hard solder or brass, and the surfaces to be joined are coated with a suitable deoxidizing medium such as soldering fat or acid. Provision is made for preventing the solder $e$ from falling out of the slits, and in the example shown in Figs. 1 and 2 a tubular lining $f$ is fitted within the pipe $a$. The said lining is made with slits $g$ corresponding in position to the slits $d$ and having an area smaller than the slits $d$. After the parts have thus been prepared and assembled the joint is heated at soldering temperature, for example by means of gas burners $o$, whereupon the molten solder is drawn by capillary action into the seam of the joint thus filling out the whole seam. The gas developed by heating and melting the solder and the deoxidizing medium escapes through the slits $g$ of the lining $f$, and thereby gas pressure within the seam is prevented which would force the solder out of the seam and would produce air or gas inclusions between the surfaces to be soldered and thus impair the quality of the joint. Preferably the size of the slits $d$ and the pieces of solder $e$ is such that the seam between the parts to be joined is completely filled with solder.

I have found that a part of the solder is drawn by capillary action into the seam provided between the pipe $a$ and the lining $f$, so that also the said lining is fixed to the pipe $a$. Thereby the said pipe is reinforced at the joint which will be desirable in many cases.

In such cases in which the reinforcement of the joint is not needed, the solder may be held in position in the manner shown in Fig. 3. The general construction of the joint is the same as has been described with refererence to Figs. 1 and 2 and the same letters of reference have been used to indicate corresponding parts. As distinguished from the example shown in Figs. 1 and 2 the tubular lining $f$ has been dispensed with and tongues $l$ are provided on the pipe $a$ internally of the slits $d$, the said tongues being preferably produced by pressing the material of the wall of the pipe $a$ inwardly when the slits $d$ are punched. Thus the said tongues are made integral at one of their ends with the pipe $a$, and at their opposite ends $g'$ and at their sides they are spaced from the said wall thus providing openings for the escape of gas or vapor from the joint when the parts are heated.

In Fig. 4 I have shown another modification in which the tubular lining $f$ and also the tongues $l$ are dispensed with, and in lieu thereof the pieces of solder $e'$ are slightly larger in size than the slits $d$, and they are pressed into the said slits. I have found that when the joint is heated the molten solder does not fall out of the slits but is drawn by capillary action into the seam provided by the pipe $a$ and the sleeve $b$.

In Fig. 5 I have shown another modification in which the pocket receiving the solder is provided merely by pressing the wall inwardly to form an elongate groove $d'$. The wall of the inwardly pressed portion is formed with the hole $g^2$ permitting the escape of gas or vapor from the joint being heated.

I claim:

1. The herein described method of soldering bodies which comprises providing a body with a pocket, providing a vent for said pocket of smaller size than the pocket, placing solid solder within said pocket, said solid solder being of such shape and size that it cannot fall out of said vent but will be held within said pocket while said solder is in the solid state, bringing said body into overlapping relationship with a second body so that the pocket in said first body with the solder therein overlaps the second body at the place where said bodies are to be joined, and with the vent in said first body being at the side thereof remote from the second body, heating the joint from the side of said second body remote from said first body sufficiently to cause the solder to melt, whereby the solder remote from the vent is melted first and caused to flow from said pocket into the adjoining space between the overlapping bodies.

2. The herein described method of soldering bodies which comprises providing a body with a pocket having a vent of smaller size than the pocket, placing solid solder within said pocket, said solder being of such size that it is overlapped by the walls of the pocket and held therein while it is in the solid state, bringing said body into overlapping relationship with a second body so that the pocket in said first body with the solder therein overlaps the second body at the place where said bodies are to be joined, and with the vent in said first body being at the side thereof remote from the second body, heating the joint from the side of said second body remote from said first body sufficiently to cause the solder to melt, whereby the solder remote from the vent is melted first and caused to flow from said pocket into the adjoining space between the overlapping bodies.

3. The herein described method of soldering bodies which comprises providing a body with an opening, combining therewith a second body with a vent opening smaller than the opening in the first body, bringing said openings in juxtaposition, so as to provide a pocket having a vent of smaller size than the pocket, placing solid solder within said pocket, said solder being of such size that it is overlapped by the walls of the pocket and held therein while it is in the solid state, bringing said bodies into overlapping relationship with a third body, so that the pocket with the solder therein overlaps said third body at the place where said bodies are to be joined, and with the vent being at the side thereof remote from said third body, heating the joint from the side remote from said vent sufficiently to cause the solder to melt, whereby the solder remote from the vent is melted first and caused to flow from said pocket into the adjoining space between the overlapping bodies.

4. The herein described method of soldering bodies which comprises providing a body with a depression forming a tongue to thereby provide a pocket with a vent for said pocket of smaller size than the pocket, placing solid solder within said pocket, said solid solder being of such shape and size that it cannot fall out of said vent but will be held within said pocket while said solder is in the solid state, bringing said body into overlapping relationship with a second body so that the pocket in said first body with the solder therein overlaps the second body at the place where said bodies are to be joined, and with the tongue in said first body being at the side thereof remote from the second body, heating the joint from the side of said second body remote from said first body sufficiently to cause the solder to melt, whereby the solder remote from the vent is melted first and caused to flow from said pocket into the adjoining space between the overlapping bodies.

AMANDUS GLASER.